United States Patent
Huh et al.

(10) Patent No.: US 9,354,756 B2
(45) Date of Patent: May 31, 2016

(54) TOUCH SCREEN PANEL AND DISPLAY DEVICE HAVING THE SAME

(71) Applicants: Jae-Won Huh, Yongin (KR); Tae-Jun Kim, Yongin (KR)

(72) Inventors: Jae-Won Huh, Yongin (KR); Tae-Jun Kim, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 319 days.

(21) Appl. No.: 13/873,281

(22) Filed: Apr. 30, 2013

(65) Prior Publication Data

US 2014/0204283 A1   Jul. 24, 2014

(30) Foreign Application Priority Data

Jan. 24, 2013   (KR) ........................ 10-2013-0008052

(51) Int. Cl.
| | |
|---|---|
| *G06F 3/044* | (2006.01) |
| *G02F 1/1335* | (2006.01) |
| *G02F 1/1333* | (2006.01) |
| *G06F 3/041* | (2006.01) |

(52) U.S. Cl.
CPC ............ *G06F 3/044* (2013.01); *G02F 1/13338* (2013.01); *G06F 3/041* (2013.01)

(58) Field of Classification Search
CPC ...... G02F 1/13338; G06F 3/044; G06F 3/041
See application file for complete search history.

(56) References Cited

U.S. PATENT DOCUMENTS

| 8,736,567 B2 * | 5/2014 | Oh ................................ 345/173 |
|---|---|---|
| 2011/0050625 A1 * | 3/2011 | Kim et al. ..................... 345/174 |
| 2011/0134055 A1 | 6/2011 | Jung et al. |
| 2011/0248953 A1 * | 10/2011 | Lee et al. ...................... 345/174 |
| 2012/0075257 A1 * | 3/2012 | Choi ....................... G06F 3/044 345/176 |
| 2012/0105343 A1 | 5/2012 | Lee et al. |
| 2012/0194474 A1 * | 8/2012 | Chang et al. .................. 345/174 |
| 2013/0285939 A1 * | 10/2013 | Kim et al. ..................... 345/173 |

FOREIGN PATENT DOCUMENTS

| KR | 10-2011-0017674 A | 2/2011 |
|---|---|---|
| KR | 10-2011-0065260 A | 6/2011 |
| KR | 10-2012-0043405 A | 5/2012 |
| KR | 10-2012-0044500 A | 5/2012 |

* cited by examiner

*Primary Examiner* — Dung Nguyen
(74) *Attorney, Agent, or Firm* — Lee & Morse, P.C.

(57) ABSTRACT

A touch screen panel includes a substrate, first sensing patterns formed in a first direction on the substrate, and second sensing patterns formed in a second direction intersected with the first direction on the substrate. The first sensing patterns include first sensing cells formed in an independent shape, respectively, between the second sensing patterns, and first connection patterns, the first connection patterns including a plurality of island patterns and a plurality of bridge patterns, the island patterns being separated and patterned in island shape in the second sensing patterns, the plurality of bridge patterns connecting between the first sensing cells and the island patterns or connecting between two adjacent island patterns, the first connection patterns connecting to the first sensing cells in the first direction.

16 Claims, 6 Drawing Sheets

TOUCH SCREEN PANEL AND DISPLAY DEVICE HAVING THE SAME

CROSS-REFERENCE TO RELATED APPLICATION

This application claims priority to and the benefit of Korean Patent Application No. 10-2013-0008052, filed on Jan. 24, 2013, in the Korean Intellectual Property Office, and entitled: "Touch Screen Panel and Display Device Having the Same," which is incorporated by reference herein in its entirety.

BACKGROUND

1. Field

Embodiments relate to a touch screen panel and a display device having the same.

2. Description of the Related Art

A touch screen panel is an input device capable of inputting a user's instruction by selecting instruction contents displayed on a screen, such as a display device, with a human hand or an object, such as a stylus pen. The touch screen panel may be provided to a front face of the display device to convert a contact position contacted by the human hand or the object into an electric signal. Therefore, instruction contents selected at the contact position may be recognized as input signal. Since the touch screen panel may be a substitute for a separate input device such as a keyboard or a mouse which are connected to the display device and operated, application fields thereof have been gradually extended.

SUMMARY

Embodiments are directed to a touch screen panel, including a substrate, first sensing patterns formed in a first direction on the substrate, and second sensing patterns formed in a second direction intersected with the first direction on the substrate. The first sensing patterns include first sensing cells formed in an independent shape, respectively, between the second sensing patterns, and first connection patterns, the first connection patterns including a plurality of island patterns and a plurality of bridge patterns, the island patterns being separated and patterned in island shape in the second sensing patterns, the plurality of bridge patterns connecting between the first sensing cells and the island patterns or connecting between two adjacent island patterns, the first connection patterns connecting to the first sensing cells in the first direction.

The first sensing cells may be disposed in parallel in the first direction and may be electrically connected to each other through a path of a first bridge pattern, a first island pattern, a second bridge pattern, a second island pattern, and a third bridge pattern.

The first to third bridge patterns and the first to second island patterns may configure one first connection pattern connecting adjacent first sensing cells to each other, and the adjacent first sensing cells may be electrically connected to each other through a plurality of paths by at least two first connection patterns.

The second bridge pattern may be disposed on a line which is twisted in the first direction with an acute angle or an obtuse angle.

Some of the bridge patterns may be disposed on a line which is twisted in the first and second direction with an acute angle or an obtuse angle.

The first sensing cells and the island patterns may be formed of a transparent electrode material.

The bridge patterns may be formed of a metal material.

The second sensing patterns may include second sensing cells and second connection patterns, the second sensing cells being alternately disposed with the first sensing cells, and the second connection patterns connecting to the second sensing cells in the second direction.

The second sensing cells and the second connection patterns may be integrally formed in a line unit according to the second direction.

The second sensing cells and the second connection patterns may be formed of a transparent electrode material.

The island patterns may be separated on an inner part of the second sensing cells in an island shape.

The first sensing cells, the island patterns, the second sensing cells, and the second connection patterns may be disposed on a same layer.

The first sensing cells, the island patterns, the second sensing cells, and the second connection patterns may be formed of a transparent electrode material.

Embodiments are also directed to a touch screen panel, including a display panel displaying an image, first sensing patterns formed in a first direction on the display panel, and second sensing patterns formed in a second direction intersected with the first direction on the display panel. The first sensing patterns may include first sensing cells formed in an independent shape, respectively, between the second sensing patterns, and first connection patterns, the first connection patterns including a plurality of island patterns and a plurality of bridge patterns, the island patterns being separated and patterned in island shape in the second sensing patterns, the plurality of bridge patterns connecting between the first sensing cells and the island patterns or connecting between two adjacent island patterns, the first connection patterns connecting to the first sensing cells in the first direction.

The first sensing cells may be disposed in parallel in the first direction and may be electrically connected to each other through a path of a first bridge pattern, a first island pattern, a second bridge pattern, a second island pattern, and a third bridge pattern.

The first to third bridge patterns and the first to second island patterns may configure one first connection pattern connecting adjacent first sensing cells to each other, and the adjacent first sensing cells may be electrically connected to each other through a plurality of paths by at least two first connection patterns.

The first sensing cells and the island patterns may be formed of a transparent electrode material.

The bridge patterns may be formed of a metal material.

The second sensing patterns may include second sensing cells and second connection patterns, the second sensing cells being alternately disposed with the first sensing cells, and the second connection patterns being integrally implemented with the second sensing cells and connecting to the second sensing cells in the second direction.

The island patterns may be separated on an inner part of the second sensing cells in an island shape.

BRIEF DESCRIPTION OF THE DRAWINGS

Features will become apparent to those of skill in the art by describing in detail example embodiments with reference to the attached drawings in which.

DETAILED DESCRIPTION

Figure 1:
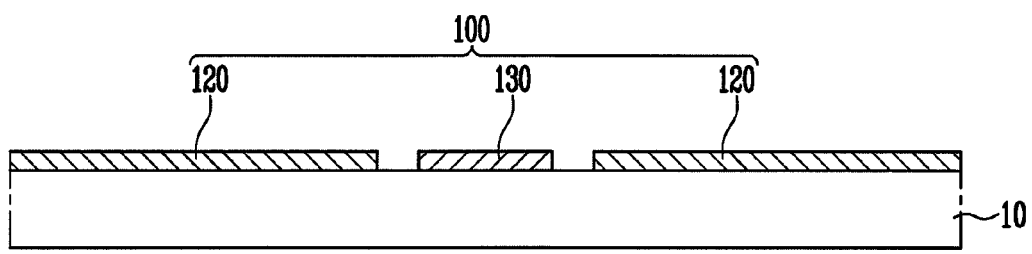
FIG. 1 is a plan view schematically illustrating an example of a display device having a touch screen panel.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Also, when an element is referred to as being "connected to" another element, it can be directly connected to the another element or be indirectly connected to the another element with one or more intervening elements interposed therebetween. Like reference numerals refer to like elements throughout.

FIG. 1 is a plan view schematically illustrating an example of a display device having a touch screen panel.

In the example embodiment shown in FIG. 1, a display device includes a display panel 10 displaying image, and a touch screen panel 100 implemented with first and second sensing patterns 120 and 130 formed on the display panel 10.

In the present example embodiment, the first sensing patterns 120 and the second sensing patterns 130 are formed to be insulated from each other and may be used as touch electrodes configuring a capacitor of a capacitive type touch screen panel.

When the touch screen panel 100 is directly formed on the display panel 10 instead of forming on a separate substrate, there is an advantage of reducing a thickness. For example, the first and second sensing patterns 120 and 130 may be formed on an organic light emitting display device or an upper surface of a liquid display device, such that a display device integral touch screen panel may be implemented. The first and second sensing patterns 120 and 130 may be formed in a different direction from each other for detecting a touch position.

Example embodiments of the first and second sensing patterns 120 and 130 will be described below, referring to FIG. 2 to FIG. 6.

Figure 2:
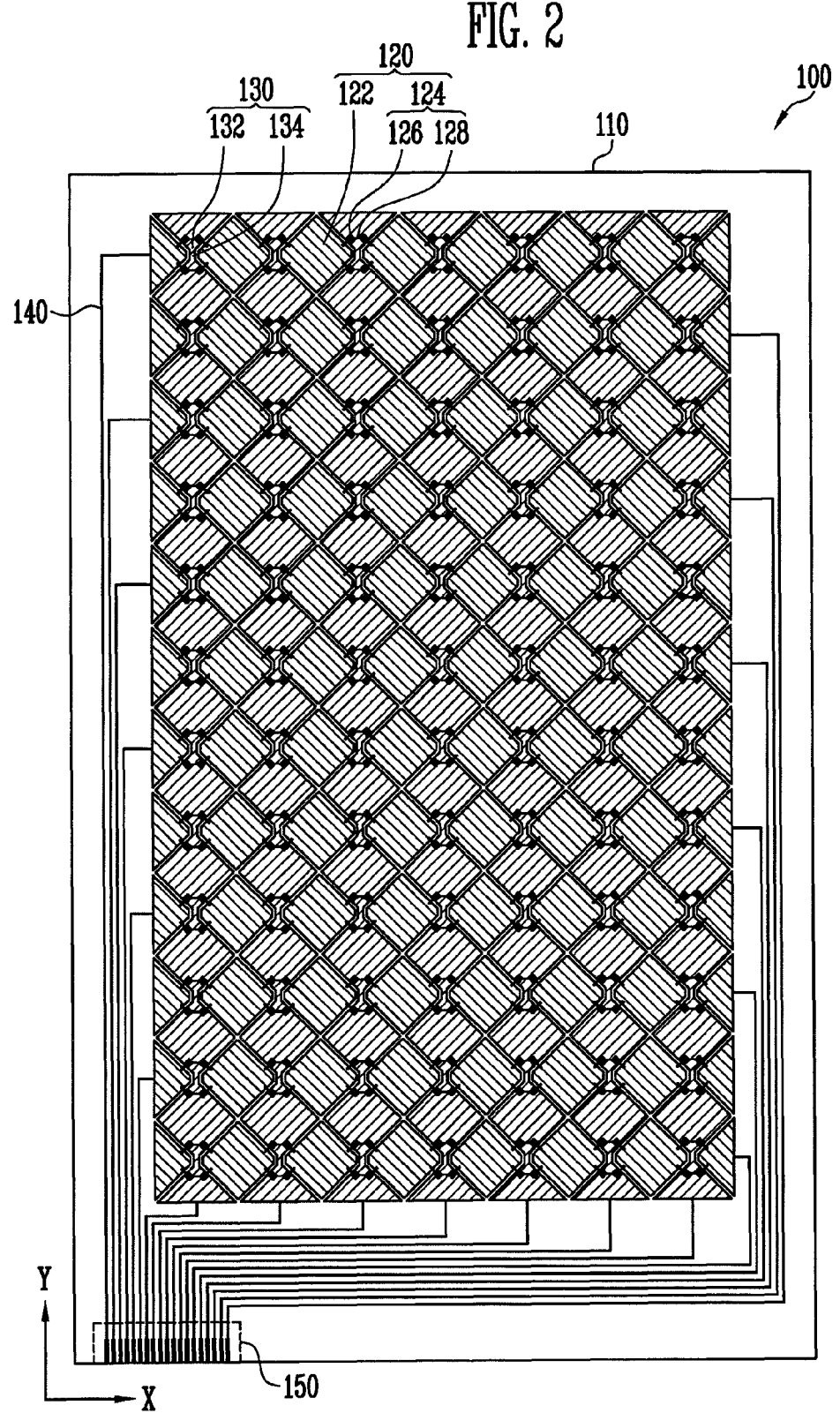
FIG. 2 is a plan view illustrating a touch screen panel according to an example embodiment.

FIG. 2 is a plan view illustrating a touch screen panel according to an example embodiment.

In the example embodiment shown in FIG. 2, a touch screen panel includes: a substrate 110, first and second sensing patterns 120 and 130 formed on the substrate 110, and peripheral wires 140 connecting the first and second sensing patterns 120 and 130 to an outside driving circuit through a pad unit 150.

The substrate 110 may be implemented by transparent substrate, such as a glass or a plastic. However, the present example embodiment is not limited thereto, and the material of the substrate 110 may be varied. The substrate 110 may be set to a separate substrate for only implementing the touch screen panel 100, or to a substrate configuring a display panel for implementing a display device integral touch screen panel.

In the present example embodiment, the first sensing patterns 120 are formed in a first direction on the substrate 110, for example, in an X direction. The first sensing patterns 120 are respectively implemented to be electrically connected in the first direction. The first sensing patterns 120 may be repeated in a second direction intersected with the first direction, for example, in a Y direction.

In the present example embodiment, the first sensing patterns 120 include first sensing cells 122 and first connection patterns 124. The first sensing cells are implemented in an independent pattern of first sensing cells that are discrete from one another, the first sensing cells being disposed between the second sensing patterns 130, respectively. The first connection patterns 124 connect to the first sensing cells 122 in the first direction. Thus, the first connection patterns 124 connect adjacent first sensing cells 122 disposed in the first direction in parallel, so that each of the first sensing patterns 120 is connected along the first direction.

In the present example embodiment, each of the first connection patterns 124 includes a plurality of island patterns 126 and bridge patterns 128, further details of which are described below.

In the present example embodiment, the second sensing patterns 130 are formed in the second direction on the substrate 110. Each of the second sensing patterns 130 is implemented to be connected in the second direction. The second sensing patterns 130 may be repeated in the first direction.

In the present example embodiment, the second sensing patterns 130 include second sensing cells 132, alternately disposed on the same layer as the first sensing cells 122, and second connection patterns 134 connecting to the second sensing cells 132 in the second direction. For example, the second sensing cells 132 and the second connection patterns 134 may be integrally patterned in a line unit according to the second direction.

In the present example embodiment, the peripheral wires 140 connect the first and second sensing patterns 120 and 130 to each of pads of the pad unit 150 in a line unit according to the first and second directions, respectively. The peripheral wires 140 are formed on a non active area of the touch screen panel 110 to avoid a display region, so that the visibility is not limited. The peripheral wires 140 may include or may be formed of a plating layer, and may be made of a low resistance metal material, such as molybdenum (Mo), silver (Ag), titanium (Ti), copper (Cu), aluminum (Al), molybdenum-aluminum-molybdenum (Mo/Al/Mo), etc.

The first and the second sensing patterns may be disposed on an active area of the touch screen panel 110 overlapped with the display region and are configured to provide a predetermined transparency or permeability to light.

The first and second sensing cells 122 and 132 positioned on a wide area may be formed of a transparent electrode material, such as indium tin oxide (ITO) or indium zinc oxide (IZO). The second connection patterns 134 integrally connected to the second sensing cells 132 may also be formed of a transparent electrode material like the second connection patterns 134.

In the present example embodiment, the first connection patterns 124 include a plurality of island patterns 126 formed of transparent electrode material and a plurality of bridge patterns 128 formed of low resistance metal material. The resistance of the sensing patterns 120 and 130 may be reduced and the visibility may be improved by controlling and designing the number of the island patterns 126 and the bridge patterns 128 and positioning thereof. Further details of examples of the sensing patterns 120 and 130 according to embodiments are described below.

Figure 3:
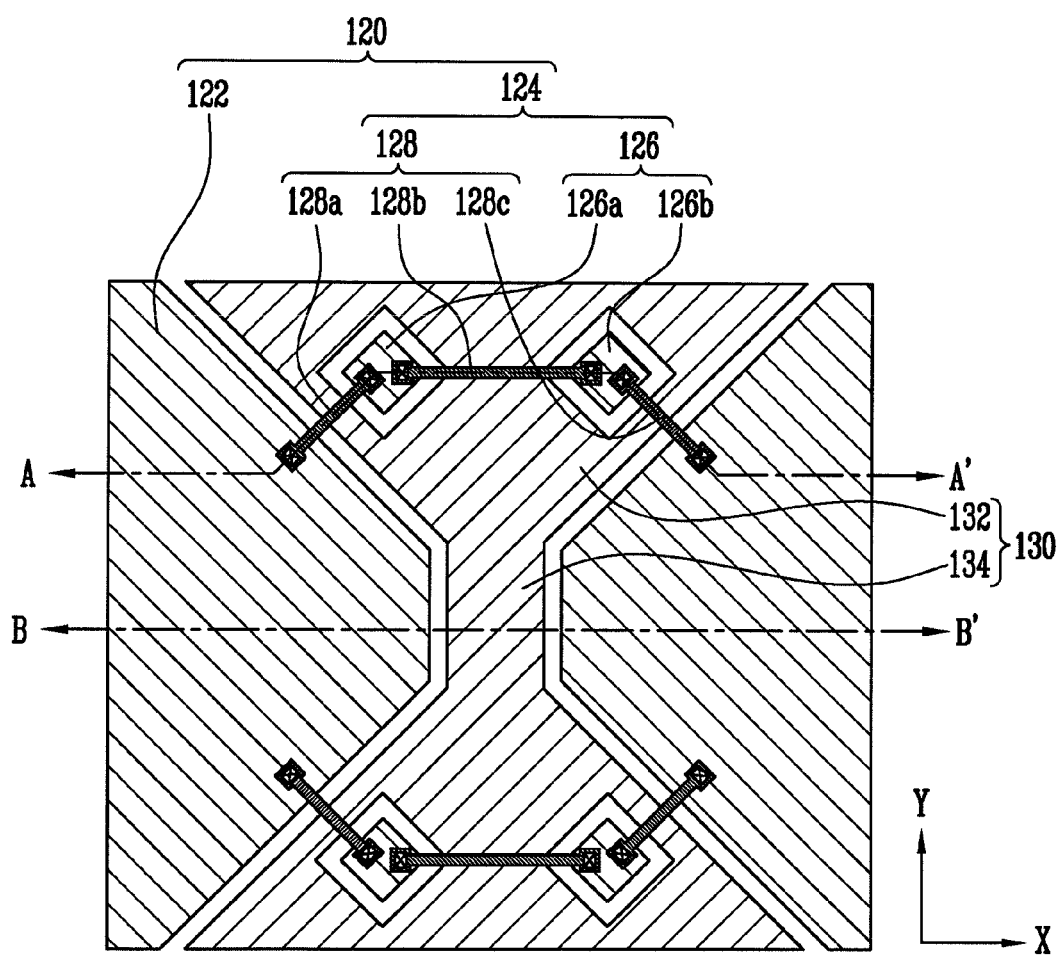
FIG. 3 is a plan view illustrating an example of sensing patterns shown in FIG. 2.
Figure 4A:
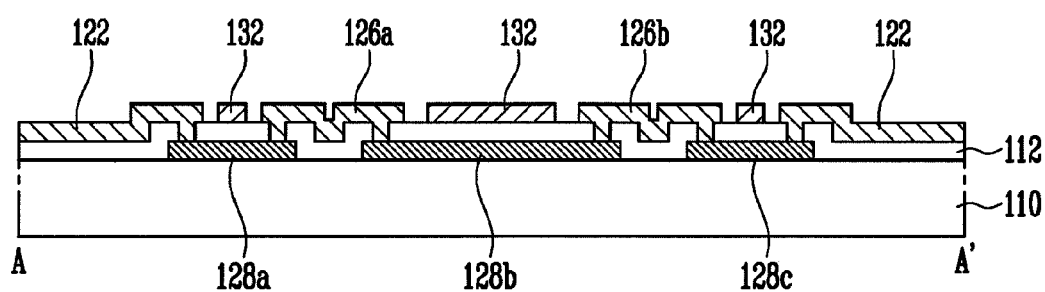
FIG. 4A is a cross-sectional view taken along the line A-A' of FIG. 3.
Figure 4B:
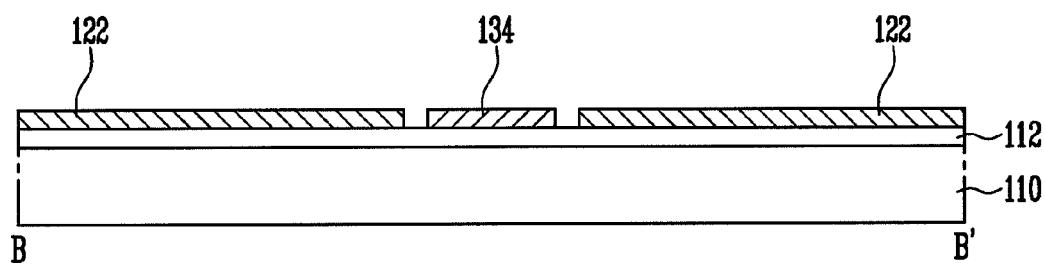
FIG. 4B is a cross-sectional view taken along line B-B' of FIG. 3.

FIG. 3 is a plan view illustrating an example of sensing patterns shown in FIG. 2. In addition, FIG. 4A is a cross-sectional view taken along the line A-A' of FIG. 3, and FIG. 4B is a cross-sectional view taken along line B-B' of FIG. 3

In the example embodiment shown in FIG. 3, the first sensing cells 122 are connected in the first direction, for example, an X direction, by the first connection patterns 124 configured with a plurality of island patterns 126 and the bridge patterns 128, and the second sensing cells 132 are connected in the second direction, for example, a Y direction, by the second connection patterns 134 integrally connected to each other.

In the present example embodiment, each of the first connection patterns 124 is configured to include the plurality of island patterns 126 which are separated with island shapes in the second sensing patterns 130 (for example, the second sensing cells 132) and is patterned. Further, each of the first connection patterns 124 is configured to include the plurality of bridges connected between the first sensing cells 122 and the island patterns 126, or between the adjacent two island patterns 126. Thus, each of the first connection patterns 124 include the island patterns 126 which is divided into at least two, and three or more the bridge patterns 128 connecting the adjacent first sensing cells 122 through the island patterns 126.

When each of the first connection patterns is configured with the first and second island patterns 126a and 126b and the first to third bridge patterns 128a, 128b, and 128c, the two first sensing cells 122 disposed in parallel in the first direction are electrically connected to each other through a path of the first bridge pattern 128a, the first island pattern 126a, the second bridge pattern 128b, the second island pattern 126b, and the third bridge pattern 128c. In addition, at least one island pattern, the bridge pattern, and the like may further be added on the path as described above.

The adjacent first sensing cells 122 may be configured to be electrically connected to each other through multiple paths of two or more first connection patterns 124. The adjacent first sensing cells 122 may be configured to be electrically connected to each other through two paths formed by a pair of first connection patterns 124 having vertical-symmetrical shape. In this case, if one first connection pattern is disconnected by static electricity generated in intersection part of the first and second sensing patterns 120 and 130, another first connection pattern maintains a connection between the first sensing cells 122, thereby improving the resistance to damage caused by static electricity.

As illustrated in FIGS. 4A and 4B, the first and second sensing cells 122 and 132, the second connection patterns 134 and the island patterns 126a and 126b are disposed on the same layer, and also, these may be formed of same transparent electrode material. In this case, the island patterns 126a and 126b are positioned on inner side of the second sensing cells 132 as described above, and the insulation between the first and second sensing patterns 120 and 130 may be secured by patterning the island patterns in an island shape separated from the second sensing cells 132.

Since the bridge patterns 128a, 128b, and 128c are overlapped with the second sensing patterns 130, the insulation film 112 is disposed therebetween and positioned on different layer from the second sensing patterns 130 for securing stability. The bridge patterns 128a, 128b, and 128c may be connected to the first sensing cells 122 and the island patterns 126a and 126b by a contact hole through the insulation film 112. However, the present example embodiment is not limited thereto. If the insulation film 112 is only formed on the overlapped region of the bridge pattern 128a, 128b, and 128c and the second sensing patterns 130, connection to the first sensing cells 122 and the island patterns 126a and 126b may be made by direct contact in a region where the insulation film 112 is not formed.

The bridge patterns 128a, 128b, and 128c may be formed of a low resistance metal material for reducing the resistance to accommodate a reduced width of an intersection part of the first and second sensing patterns 120 and 130. For example, the bridge patterns 128a, 128b, and 128c may be formed in same process and of same material of the peripheral wires 140 illustrated in FIG. 2, in which case the process is simple and the manufacturing efficiency can be increased.

According to the present example embodiment as described above, the first and second sensing cells 122 and 132, the second connection patterns 134, and the island patterns 126 are formed on the same layer using a transparent electrode material, thereby making it possible to implement a transparent touch screen panel and minimize the touch screen panel. Also, in the case of the bridge patterns 128, these are formed of a resistance metal material lower than that of the transparent material. Therefore, the resistance may be improved.

In the present example embodiment, by configuring each of the first connection patterns 124 including the island patterns 126 divided into at least two small pieces, the resistance of the first sensing patterns 120 is improved by reducing the region of the island patterns 126 in the first connection patterns 124 comparing with a case in which one island pattern is formed to be large. In addition, the more decrease a region of the island patterns 126, the more increase a region of the second sensing patterns 130, thereby improving a signal pass region according to the second direction. Therefore, according to the present example embodiment, the resistance of the first and second sensing patterns 120 and 130 may be reduced. Also, although the bridge pattern 128 is formed of a low resistance metal material, visibility may not be significant due to the short length of the bridge patterns 128, and thereby making it possible to easily design by control the width or length thereof, in order to reduce or eliminate the visibility thereof. Also, visualization of the bridge patterns 128 is prevented using human's angle of vision which awareness of sideline direction is more decreased than the horizontal direction and the vertical direction, and a phenomenon of covering the pixel of the display panel positioned at lower side may be prevented. A detailed exemplary embodiment thereof will be described below with reference to FIGS. 5 through 6.

Figure 5:
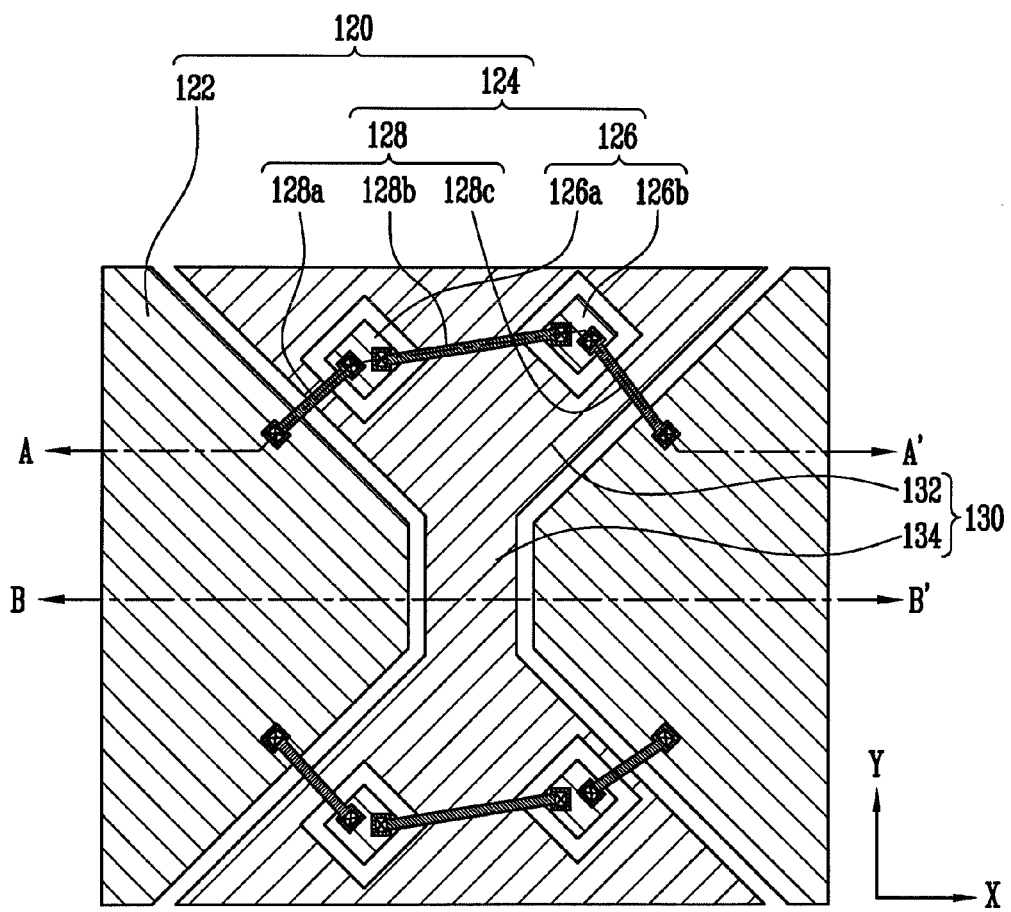
FIG. 5 is a plan view illustrating another example of sensing patterns shown in FIG. 2.
Figure 6:
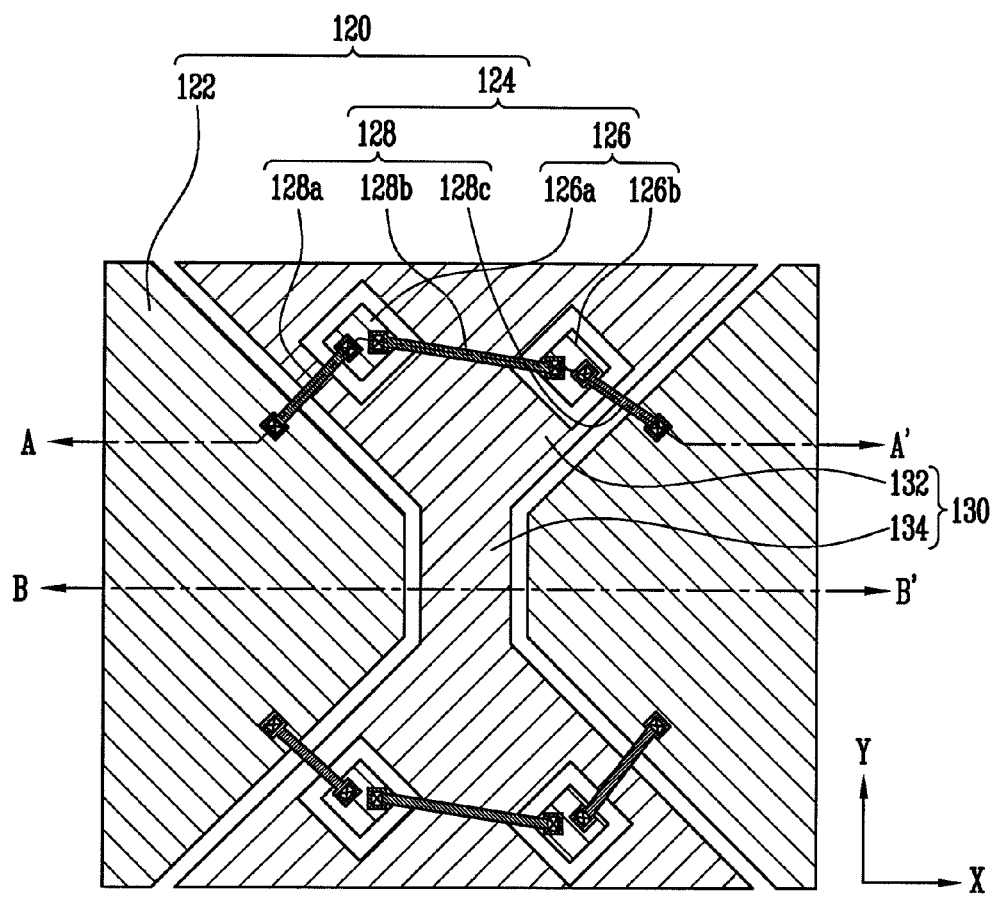
FIG. 6 is a plan view illustrating still another example of sensing patterns shown in FIG. 2.

FIG. 5 is a plan view illustrating another example of sensing patterns shown in FIG. 2, FIG. 6 is a plan view illustrating still another example of sensing patterns shown in FIG. 2. For convenience, in FIGS. 5 and 6, components that are similar to those of FIG. 3 will be denoted by the same reference numerals and details thereof will not be repeated.

In the example embodiment shown in FIGS. 5 and 6, the second bridge patterns 128b disposed in the first direction, that is, a horizontal direction, are disposed on the line which is twisted in a side direction having acute or obtuse angles to the first direction, such that visualization of the second bridge patterns 128b is prevented and also a phenomenon of covering the pixel of the display panel positioned at lower side may be prevented. For example, in the case where the Y direction represents a direction parallel to a height of the display and the X direction represents a direction parallel to a width of the display, the second bridge patterns 128b may have an angle with respect to the horizontal direction that is non-zero, i.e., the second bridge patterns 128b extend in a direction that is not parallel with the X or horizontal direction. In addition, the first and third bridge patterns 128a and 128c are maintained to be disposed on the side which is twisted in a side direction having acute or obtuse angles to the first and second directions, thereby helping prevent visualization thereof and minimizing a phenomenon of covering the pixel. Thus, according to the present example embodiment illustrated in FIGS. 5 and 6, the bridge patterns 128 are disposed in side direction, thereby helping prevent visualization and minimizing a pixel covering phenomenon.

By way of summation and review, types of touch screen panels include a resistive type, an optical sensing type, a capacitive type, and the like. Among them, the capacitive type touch screen panel converts a contact position into an electrical signal when a conductive sensing pattern senses a change in capacitance formed over adjacent sensing patterns or ground electrodes, or the like, by contacting the panel with a user's hand or an object. The capacitive type touch screen panel includes first sensing patterns formed to be connected along a first direction, second sensing patterns formed to be connected along a second direction interested with the first direction, and peripheral wires connecting the first sensing patterns and the second sensing patterns to touch driving circuits, or the like. In a general touch screen, insulation is provided between the first sensing patterns and the second sensing patterns, and the first sensing patterns and the second sensing patterns are positioned on a layer different from each other having an insulation film, or they are positioned on a same layer, and the patterns are connected in the first or second direction by a bridge pattern. When the first and the second sensing patterns are positioned on the same layer, there may be an advantage of reducing thickness. The first and second sensing patterns may be formed by using transparent material, such as indium tin oxide (ITO) or indium zinc oxide (IZO), so as to transmit light from a display panel, and the bridge pattern may be formed using low resistance metal material. When the bridge pattern is formed of opaque metal material, there is an advantage of reducing the resistance of the sensing pattern. However, the bridge pattern may be visible and may be recognized by a user.

As described above, embodiments relate to a touch screen panel configured to reduce resistance of sensing patterns and while reducing visibility of components of the touch screen panel. Embodiments also relate to a display device having the same. In a touch screen panel and a display device having the same according to embodiments, the sensing cells are disposed to wide area of the touch screen panel and are implemented by transparent electrode material disposed on a same layer, thereby implementing a thin type touch screen panel and helping to secure transparency. In addition, according to embodiments, each of the connection patterns (the first connection patterns) separated from the sensing cells includes a plurality of the island patterns, which is implemented in a transparent material and is divided into at least two, and a plurality of the bridge patterns, which is implemented by a low resistance metal material and connects the island patterns to the sensing cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A touch screen panel, comprising:
a substrate;
first sensing patterns formed in a first direction on the substrate; and
second sensing patterns formed in a second direction intersected with the first direction on the substrate,
wherein the first sensing patterns include:
first sensing cells formed in an independent shape, respectively, between the second sensing patterns, and
first connection patterns, the first connection patterns including a plurality of island patterns and a plurality of bridge patterns, the island patterns being separated and patterned in island shape in the second sensing patterns, the plurality of bridge patterns connecting between the first sensing cells and the island patterns or connecting between two adjacent island patterns, the first connection patterns connecting to the first sensing cells in the first direction, the first sensing cells being disposed in parallel in the first direction and electrically connected to each other through a path of a first bridge pattern, a first island pattern, a second bridge pattern, a second island pattern, and a third bridge pattern, such that the second bridge pattern does not overlap the first bridge pattern or the third bridge pattern, the second bridge pattern being at an acute angle or an obtuse angle with respect to the first direction.

2. The touch screen panel as claimed in claim 1, wherein the first to third bridge patterns and the first to second island patterns configure one first connection pattern connecting adjacent first sensing cells to each other, and the adjacent first sensing cells are electrically connected to each other through a plurality of paths by at least two first connection patterns.

3. The touch screen panel as claimed in claim 1, wherein the first sensing cells and the island patterns are formed of a transparent electrode material.

4. The touch screen panel as claimed in claim 1, wherein the bridge patterns are formed of a metal material.

5. The touch screen panel as claimed in claim 1, wherein the second sensing patterns include second sensing cells and second connection patterns, the second sensing cells being alternately disposed with the first sensing cells, and the second connection patterns connecting to the second sensing cells in the second direction.

6. The touch screen panel as claimed in claim 5, wherein the second sensing cells and the second connection patterns are integrally formed in a line unit according to the second direction.

7. The touch screen panel as claimed in claim 5, wherein the second sensing cells and the second connection patterns are formed of a transparent electrode material.

8. The touch screen panel as claimed in claim 5, wherein the island patterns are separated on an inner part of the second sensing cells in an island shape.

9. The touch screen panel as claimed in claim 8, wherein the first sensing cells, the island patterns, the second sensing cells, and the second connection patterns are disposed on a same layer.

10. The touch screen panel as claimed in claim 8, wherein the first sensing cells, the island patterns, the second sensing cells, and the second connection patterns are formed of a transparent electrode material.

11. A touch screen panel, comprising:
a display panel displaying an image;
first sensing patterns formed in a first direction on the display panel; and
second sensing patterns formed in a second direction intersected with the first direction on the display panel,
wherein the first sensing patterns include:
first sensing cells formed in an independent shape, respectively, between the second sensing patterns, and
first connection patterns, the first connection patterns including a plurality of island patterns and a plurality of bridge patterns, the island patterns being separated and patterned in island shape in the second sensing patterns, the plurality of bridge patterns connecting between the first sensing cells and the island patterns or connecting between two adjacent island patterns, the first connection patterns connecting to the first sensing cells in the first direction, the first sensing cells being disposed in parallel in the first direction and electrically connected to each other through a path of a first bridge pattern, a first island pattern, a second bridge pattern, a second island pattern, and a third bridge pattern, such that the second bridge pattern does not overlap the first bridge pattern or the third bridge pattern, the second bridge pattern being at an acute angle or an obtuse angle with respect to the first direction.

12. The touch screen panel as claimed in claim 11, wherein the first to third bridge patterns and the first to second island patterns configure one first connection pattern connecting adjacent first sensing cells to each other, and the adjacent first sensing cells are electrically connected to each other through a plurality of paths by at least two first connection patterns.

13. The touch screen panel as claimed in claim 11, wherein the first sensing cells and the island patterns are formed of a transparent electrode material.

14. The touch screen panel as claimed in claim 11, wherein the bridge patterns are formed of a metal material.

15. The touch screen panel as claimed in claim 11, wherein the second sensing patterns include second sensing cells and second connection patterns, the second sensing cells being alternately disposed with the first sensing cells, and the second connection patterns being integrally implemented with the second sensing cells and connecting to the second sensing cells in the second direction.

16. The touch screen panel as claimed in claim 15, wherein the island patterns are separated on an inner part of the second sensing cells in an island shape.

* * * * *